| United States Patent [19] | [11] Patent Number: 4,628,465 |
|---|---|
| Ito et al. | [45] Date of Patent: Dec. 9, 1986 |

[54] METHOD AND APPARATUS FOR MEASURING SHAPE OF INJECTED SUBSTANCE

[75] Inventors: Shinzo Ito, Chita-gun; Yasuhiro Kaneko, Kariya, both of Japan

[73] Assignee: Nippondenso Co., Ltd., Kariya City, Japan

[21] Appl. No.: 668,871

[22] Filed: Nov. 6, 1984

[30] Foreign Application Priority Data

Nov. 10, 1983 [JP] Japan .............................. 58-211589

[51] Int. Cl.$^4$ .......................................... G06F 15/626
[52] U.S. Cl. ..................... 364/521; 364/518; 364/431.05; 358/100; 382/52; 431/79
[58] Field of Search ............... 364/518, 477, 521, 524, 364/525, 556, 431.05; 382/20, 52; 358/100; 340/723, 724, 744, 793, 799; 118/665, 688; 431/13, 75, 79

[56] References Cited

U.S. PATENT DOCUMENTS

| 3,736,411 | 5/1973 | Berndt | 364/521 |
| 3,988,104 | 10/1976 | Barker | 431/79 |
| 4,015,240 | 3/1977 | Swonger et al. | 382/52 |
| 4,298,945 | 11/1981 | Kyte et al. | 364/521 |
| 4,463,437 | 7/1984 | Schenek et al. | 364/477 |
| 4,514,818 | 4/1985 | Walker | 364/521 |
| 4,520,390 | 5/1985 | Pardes | 358/100 |

*Primary Examiner*—Parshotam S. Lall
*Attorney, Agent, or Firm*—Cushman, Darby & Cushman

[57] ABSTRACT

The present invention concerns a method of measuring the shape of an injected substance and an automated apparatus for carrying out such a method. In the invention, an optical image of the injected substance, such as atomized fuel mist is projected on a photoelectric converter, and it is converted to video signal. The video signal is sampled at each picture element and the sampled data are memorized in a data memory unit and computed for obtaining a linear luminance distribution function, by determining a line to cut an optical image, then selecting line elements of a fixed length perpendicular to the cut line and computing an average luminance at the individual line elements. The linear luminance distribution function thus obtained stands for a sectional view of a shape of the injected substance mist. And judgment whether the shape is satisfactory or not can be executed on the basis of various shape factors extracted by use of the linear luminance distribution function. The present apparatus can judge, whether, for example, nozzle of a fuel injector is satisfactory or not with high precise.

7 Claims, 12 Drawing Figures

METHOD AND APPARATUS FOR MEASURING SHAPE OF INJECTED SUBSTANCE

BACKGROUND OF THE INVENTION

1. Field of the Invention;

The present invention relates to a method of and an apparatus for measuring the shape of a substance composed of a liquid, solid or gas injected from an opening of a nozzl or the like.

2. Description of the Prior Art;

It has been generally customary heretofore that measuring the shape of an injected substance is executed by photography and the shape is judged to be satisfactory or not merely by visual inspection. In fact, the shape of an atomized fuel mist injected from a fuel injector for an internal combustion engine exerts a great influence on the performance of the engine. Therefore, in evaluating the engine performance, it is necessary to attain an accurate evaluation with regard to the shape of atomized fuel mist. However, there exists no adequate method or apparatus automated for achieving high-precision efficient measurement of the shape of an injected fuel mist. Consequently, check of the atomized fuel shape executed by visual inspection is naturally concomitant with individual differences in the shape evaluation, hence inducing inaccuracy in the measurement and requiring considerable time for the evaluation.

SUMMARY OF THE INVENTION

The present invention has been accomplished in an attempt to eliminate the disadvantages observed in the prior art.

A primary object of the present invention is to provide an improved method of measuring the shape of an injected substance rapidly with a high precision, and an apparatus capable of executing such measurement in an automated process.

In the invention, an optical image of the injected substance, such as atomized fuel mist, is projected on a photoelectric converter and is converted to video signal. The video signal is sampled at each picture element to get a plane luminance distribution function. An imaginal cut line is placed on the plane image and plural line elements of constant length are taken perpendiculary to the cut line.

An average value of luminance on each line element is calculated to get a linear luminance distribution function with respect to the cut line. Evaluation of the shape of the injected substance is executed by extracting shape factors specifing the linear distribution function.

Therefore, according to the present invention, specifying the shape of injection can be performed to accomplish accurate measurement of it and also evaluation of nozzle with high preciseness and rapidity.

Furthermore, by virtue of averaging the luminance distribution in a predetermined very small segment, microscopic shape measurement is achievable accurately even with respect to an injection substance consisting of particles. Besides the above, due to the use of the linear luminance distribution function, extraction of various shape factors is carried out easily to attain precise and fast evaluation of the shape of any injection substance.

DETAILED DESCRIPTION OF THE INVENTION

In the method of this invention to measure the shape of an injected substance, the measurement is carried out in the combined steps of: forming, on a photoelectric converter, an optical image of the substance injected from an opening; scanning the optical image on the photoelectric converter and thereby producing a video signal corresponding to the luminance of the optical image; sampling the video signal in conformity with plane coordinates on the photoelectric converter and computing a plane luminance distribution function of the optical image; determining a line to cut the optical image, then selecting line elements of a fixed length perpendicular to the cut line, and computing an average luminance at the individual line elements on the basis of the plane luminance distribution function, thereby obtaining a linear luminance distribution function of the optical image along the cut line; and specifying the shape of the injected substance according to the linear luminance distribution function.

In the above, the opening denotes a nozzle or orifice adapted for injection of a liquid, solid or gas. And the substance to be injected is defined here as any of particles, atomized liquids and gases. For example, it may be a fuel spray introduced from a fuel injector in an internal combustion engine, a flame jetted from a gas burner, or a coating spray. The photoelectric converter for forming an optical image of such an injected substance thereon may be composed of an image pickup tube such as image orthicon, image isocon, SEC tube, SIT tube vidicon, saticon or silicon vidicon; or an arrangement of semiconductor photoelectric converter elements such as photodiode array, CCD of BBD array. Scanning the optical image on the photoelectric converter is carried out in a different manner depending on the type of each photoelectric converter. When the converter is composed of an image pickup tube, for example, the scanning is executed by deflecting electron beam to obtain a continuous waveform of a video signal modulated correspondingly to the luminance of the optical image. In the case of a matrix array of semiconductor photoelectric converter elements, a scanning signal serves as a gate signal for each converter element, and a video signal is produced correspondingly to the luminance of each picture element.

Figure 1:
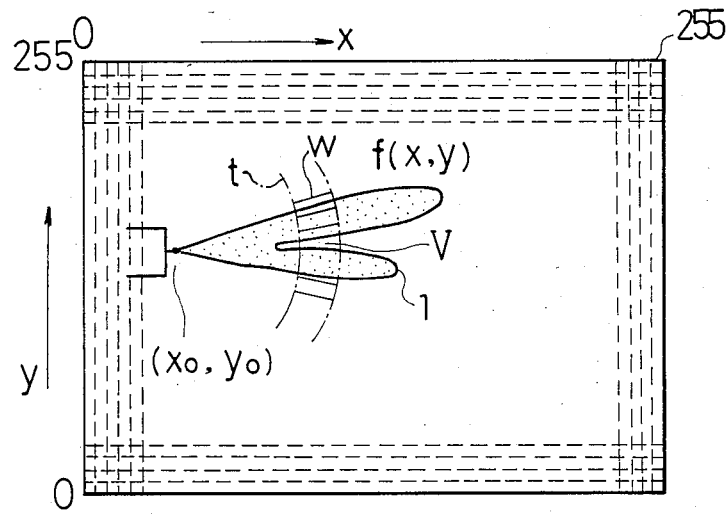
FIGS. 1 through 4 are diagrams for explaining a method of measuring the shape of an injected substance according to the present invention, of which FIG. 1 graphically shows the shape of an injected substance, FIG. 2 explains a means for computing a linear luminance distribution function from the plane luminance distribution function shown in FIG. 1, FIG. 3 graphically shows the linear luminance distribution function thus obtaind, and FIG. 4 explains another means for computing a linear luminance distribution function.

FIG. 1 shows the shape of an optical image projected on a photoelectric converter. An optical image 1 of an injected substance can be derived in the form of video signal through horizontal and vertical scanning. The luminances of the image in the individual matrix picture elements divided at minute intervals on the photoelectric converter are sampled from such video signal, and a plane luminance distribution function of the optical image is computed with the sampled plane coordinates being used as variables. The plane luminance distribution function f(X, Y) thus obtained on the basis of such discrete sampled coordinates (X, Y) is data-processed as follows.

Figure 2:
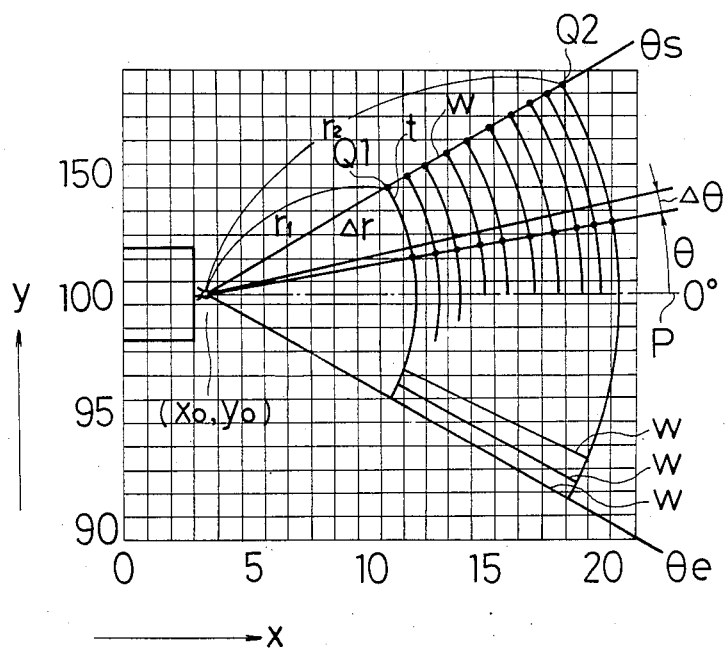

FIG. 2 graphically shows how such processing is executed. In the present invention, first a line t is determined to cut the optical image as plotted in FIGS. 1 or 2, and after a linear luminance distribution function along the cut line is computed, the shape is measured on the basis of such function. The linear luminance distribution function along the cut line t is obtained from the following equation.

$$g(\theta) = 1/(r2 - r1) \cdot \int_{r1}^{r2} R(r, \theta) \, dr \quad (1)$$

where (r, θ) are polar coordinates of an initial line extending from an origin (xo, yo) along a center axis p of an injected substance; R(r, θ) is a plane luminance distribution function representing the luminance of an optical image at the polar coordinates (r, θ) continuously; r1 denotes an integral lower limit in the direction of a radius vector; and r2 denotes an integral upper limit in the direction of a radius vector. As is manifest from Eq. (1), g(θ) represents an average luminance of the optical image in an integral segment Q1–Q2 with respect to the value of θ. Therefore, g(θ) is an average linear luminance distribution function along the cut line t taken in the direction of an azimuthal angle. Thus, the feature of the method according to this invention resides in computing the linear luminance distribution function along the cut line t by determining line elements W(Q1–Q2) of a fixed length vertically to the cut line t and averaging the luminance at the individual line elements in such segment.

Further in detail, a discrete plane luminance distribution function R(r, θ) converted into polar coordinates is computed from the discrete plane luminance distribution function f(X, Y) obtained by sampling the video signal, and the integration of Eq. (1) is executed with respect to the discrete plane luminance distribution function R(r, θ), thereby computing a discrete linear luminance distribution function g(θ).

Figure 3:
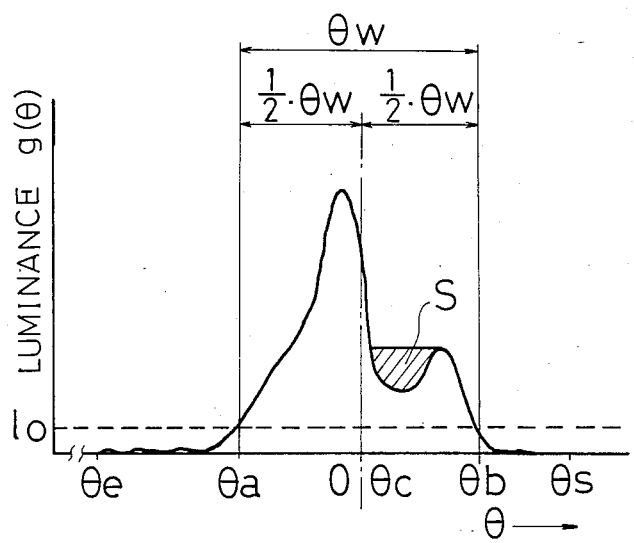

FIG. 3 shows a continuous curve plotted by tracing the discrete linear luminance distribution function g(θ) thus obtained. This function g(θ) represents an averaged sectional shape obtained by cutting the plane luminance distribution function R(r, θ) along the line t in the optical image 1 of the injected substance. The injected substance is judgeable to be satisfactory or not from the shape of such function g(θ). That is, with reference to a fixed threshold level lo preset relative to the luminance, a range exceeding the threshold level is computed to find an injection angle θw. Half of the angle θw is obtainable as a direction θc of the center axis P of injection. Moreover, the shape of injection can be evaluated in accordance with the area of recess S formed in the shape. Also the center of gravity of the waveform can be calculated from the following equation.

$$G = \int_{\theta a}^{\theta b} \theta \cdot g(\theta) \, d\theta / \int_{\theta a}^{\theta b} g(\theta) \, d\theta \quad (2)$$

It is further possible to compute the ratio between the total area of the entire waveform and the area of a partial waveform existing within a predetermined region of injection. The above factors are extracted with regard to the shape of injection, and the injected substance can be checked if it is in a satisfactory shape or not in accordance with such factors.

Figure 4:
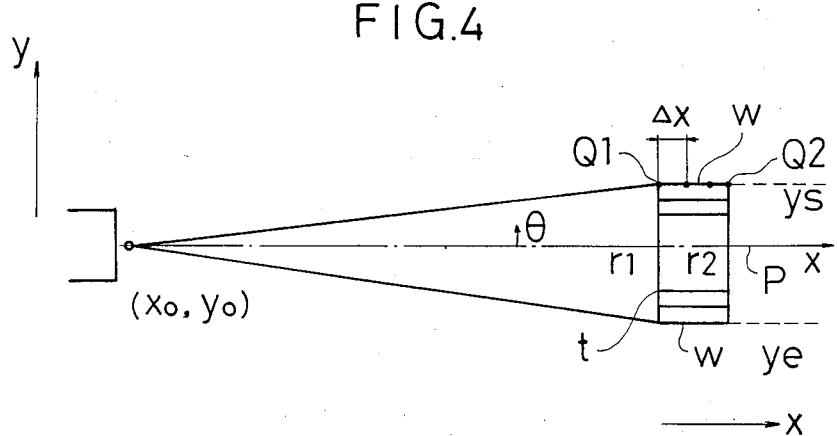

Although in the foregoing description the azimuthal direction is selected to determine the direction of the cut line t, the direction thereof is not limited to the azimuthal direction alone, and any other suitable direction may be selected as well. For example, the cut line t may be set vertically to the center axis p of injectin as shown in FIG. 4, and a linear luminance distribution function relative to the selected direction may be computed. In case the ratio of the injection angle to the injection distance is small, a distribution function obtained is substantially equal to the linear luminance distribution function along the aforesaid azimuthal direction.

Now a second aspect of the invention in the present application will be described below.

Figure 5:
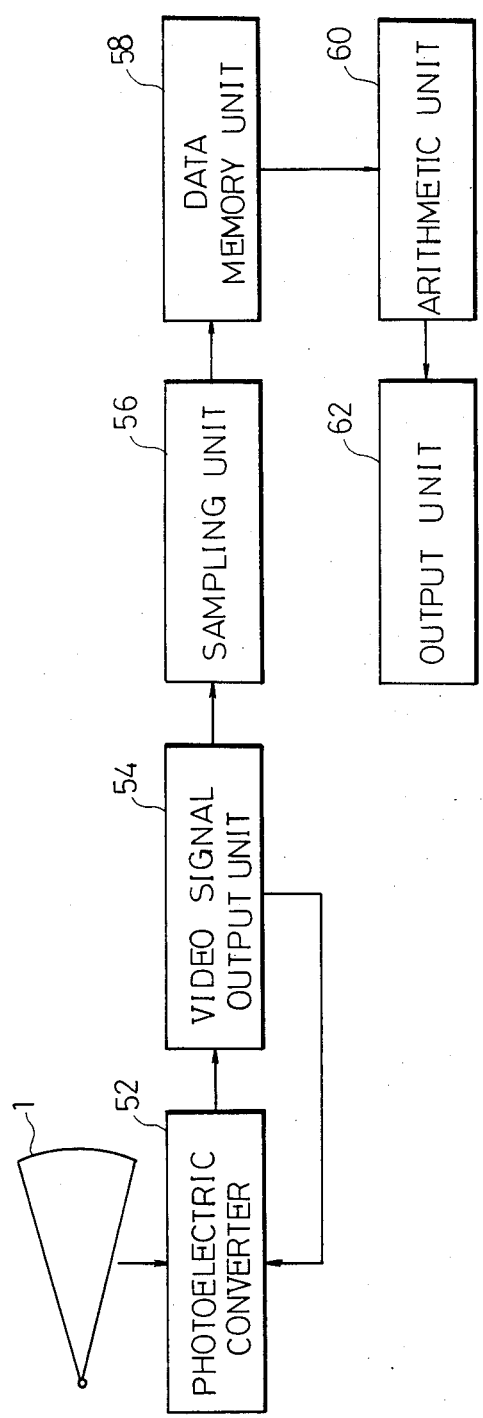
FIG. 5 is a block diagram showing the conception of an apparatus according to the invention.

The second aspect of the invention relates to an automated apparatus contrived to carry out the method of measurement mentioned above. FIG. 5 is a block diagram showing the conception of the apparatus according to the invention, in which an optical image 1 of injected substance is projected onto a photoelectric converter 52. A video signal output unit 54 transmits a scanning signal to the photoelectric converter 52, subsequently receives therefrom video signals corresponding to the luminances of individual picture elements and feeds the input video signals to a sampling unit 56, which then samples the video signals in conformity with discrete plane coordinates corresponding to matrix picture elements arrayed on the photoelectric converter 52. The luminance data thus obtained by such sampling are converted into digital signals, which are stored in a data memory unit 58 in conformity with the coordinates of the individual picture elements. The luminance data stored in the data memory unit 58 represents the discrete plane luminance distribution function. An arithmetic unit 60 computes a linear luminance distribution function by the aforementioned method on the basis of the discrete plane luminance distribution function. And an output unit 62 provides the linear luminance distribution function, from which the shape of the injected substance can be consequently evaluated.

The apparatus according to the present invention has the constitution mentioned above.

DESCRIPTION OF THE PREFERRED EMBODIMENT

Hereinafter the detail of the present invention will be described in detail.

Figure 6:
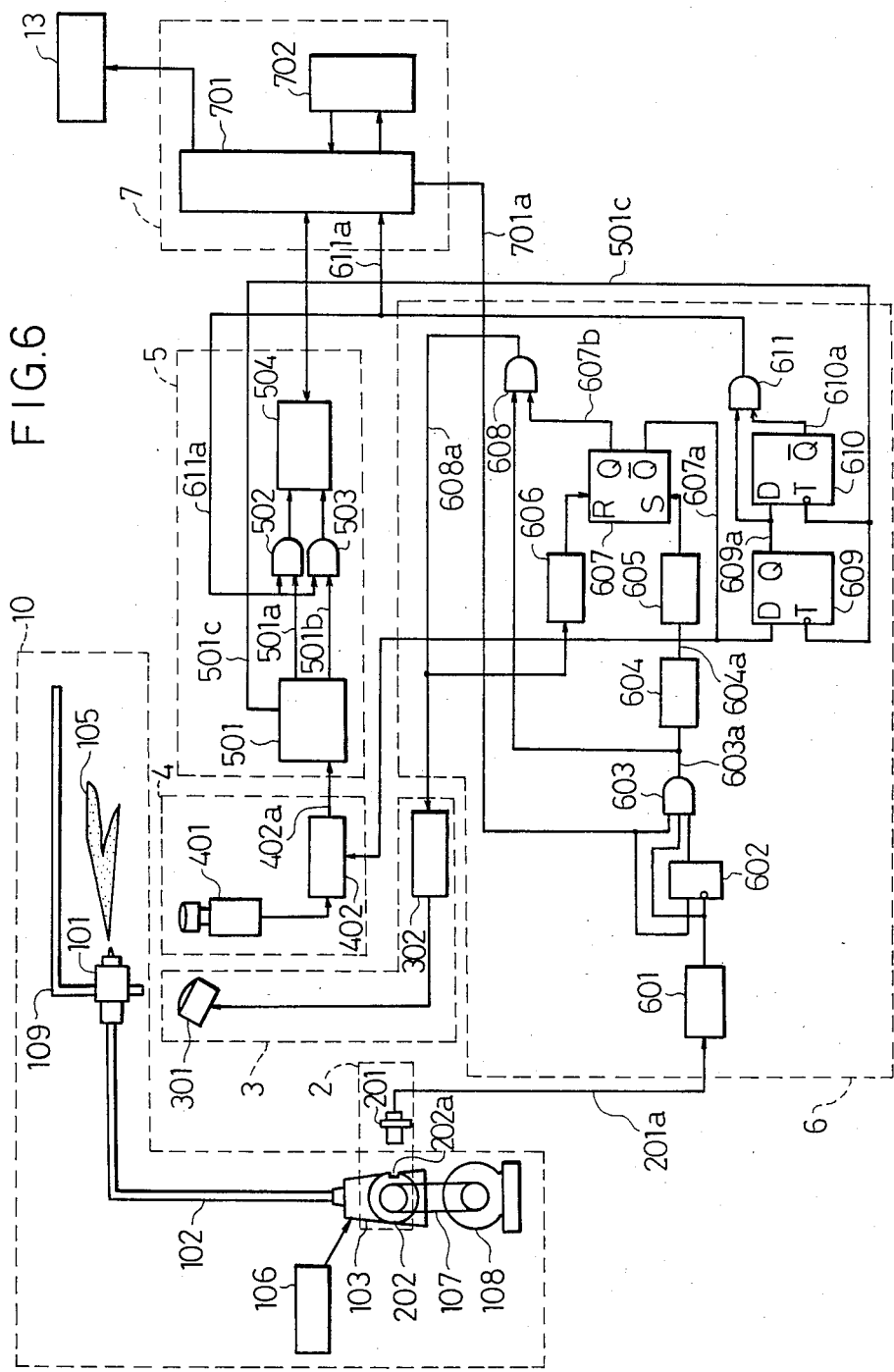
FIG. 6 is a block diagram showing the constitution of a first exemplary measuring apparatus embodying the invention.

FIG. 6 is a block diagram showing an exemplary sutructure of an apparatus embodying the invention.

This embodiment relates to an apparatus designed for measuring the shape of an atomized fuel mist in an internal combustion engine. The apparatus principally comprises a fuel injector 10, a light emitter 3 for irradiating an atomized fuel mist 105, a television camera 4 for picking up an image of the atomized fuel mist 105, a video input memory 5 for storing therein luminance data obtained by sampling the output video signal of the television camera in conformity with the plane coordinates of individual picture elements, a detector 2 for detecting the timing of injection of the fuel injector 10, a control signal generating circuit 6 for generating various control signals, a microcomputer 7 for principally executing computation and centralized control, and an output unit 13 for providing the result of computation.

The fuel injector 10 is equipped with a nozzle 101, from which a fuel is injected so that an atomized fuel mist 105 is formed. The fuel is delivered under pressure from a fuel feeder 106 to a high-pressure injection pipe 102 of steel by means of an injection pump 103. The pump 103 is driven by a motor 108 through a pulley 107. And a screen 109 is disposed for interception of light so as to attain clear projection of the image of the atomized fuel mist 105. The injection timing detector 2 comprises a photoelectric sensor 201 and a disk 202 which has a slit 202a and is connected directly to the rotary shaft of the pump 103. The photoelectric sensor 201 serves to detect the position of the slit 202a. The fuel is injected from the nozzle 101 upon detection of the slit 202a.

The light emitter 3 comprises a stroboscope 301 and a circuit 302 for driving the stroboscope 301. The circuit 302 performs such a driving action in response to a signal received from the control signal generating circuit 6.

The television camera 4 comprises an image pickup tube 401 and a controller 402 for controlling the pickup tube 401. The controller 402 scans the image pickup tube 401 both horizontally and vertically to produce video output signals, which are then fed to the memory 5. In the television camera 4, its interlacing ratio is selected to be 1:1, and none of video signals 402a is outputted in case a frame blanking signal 607a is at a low level. When the frame blanking signal reaches a high level, scanning is initiated synchronously with the vertical synchronous signal. One frame is constituted of 256 horizontal scanning lines to produce a video signal 402a.

The memory 5 comprises a video A-D converter 501 for sampling the video signals in conformity with plane coordinates of individual picture elements and converting the sampled values into digital signals, an AND gate 502 for providing an address signal corresponding to individual plane coordinate synchronously with a video input start signal 611a, an AND gate 503 for providing the sampled luminance data, and a picture memory 504 for storing the luminance data therein. The video A-D converter 501 samples the video signal per picture element, then converts the result into a digital signal and produces both an address signal 501a and a luminance data signal 501b. The address signal 501a is outputted in the form of a serial pulse signal which starts from a vertical synchronizing signal 501c (address 0) with 256 pulses in one horizontal scanning line. This address signal is synchronized with a horizontal synchronizing signal at every 256th pulse. An address I for an Xth picture element on a Yth horizontal scanning line can be expressed as $$I = 256(Y-1) + X \tag{3}$$

The AND gates 502 and 503 permit passage of the address signal 501a and the luminance data signal 501b therethrough only when the video input start signal 611a is at a high level, so that the luminance data signal 501b is stored at an address specified in the picture memory 504 by the contents of an address counter (not shown) renewed by the address signal 501. The picture memory 504 is connected to the microcomputer 7 so that the luminance data are loaded therein.

The circuit 6 generates various control signals, wherein a shaping circuit 601 serves to shape into pulse waveform the injection timing signal 201a outputted from the sensor 201. And a latch circuit 602 serves to latch a measurement start signal 701a, which is received from the microcomputer, synchronously with the timing signal 201a. There are also shown an AND gate 603 for providing an intrameasurement injection timing signal 603a which corresponds to an injection timing signal 201a during a high level of a measurement start signal 701a; a delay circuit 604 for delaying the intrameasurement injection timing signal 603a for a fixed time tf and thereby outputting a frame blanking start signal 604a; a fall detector circuit 605 for setting a set-reset circuit 607; a reset circuit 606 for detecting fall of a stroboscope flash command 608a and resetting the set-rest circuit 607 which generates frame blanking signals 607a and 607b; an AND gate 608 for outputting a stroboscope flash command 608a in response to both the intrameasurement injection timing signal 603a and the frame blanking signal 607b received; a delay type flip-flop(hereinafter referred to an "FF") circuit 609 using the vertical synchronizing signal 501c from the video input memory 5 as a clock signal while using the frame blanking signal as a set signal; a delay type FF circuit 610 using a Q-terminal output of the FF circuit 609 as a set signal; and an AND gate 611 for generating a video input start signal 611a in response to the outputs of the D-type FF circuits 609 and 610.

In fact, the control circuit 6 receives a measurement start signal 701a from the microcomputer 7 while receiving an injection timing signal 201a from the detector 2 and a vertical synchronizing signal 501c from the video input memory 5, and produces a stroboscope flash command 608a, a frame blanking signal 607a and a video input start signal 611a to control the stroboscope 3, the television camera 4 and the video input memory 5 respectively.

The microcomputer 7 produces a measurement start signal 701a to start the control signal generating circuit 6 while reading the luminance data stored in the video input memory 5 to execute data processing on the basis of such luminance data, and indicates in the output unit 13 the linear luminance distribution function thus obtained. Reference numerals 701 and 702 denote a CPU and a memory, respectively.

Now a description will be given on how the above apparatus operates.

Figure 7:
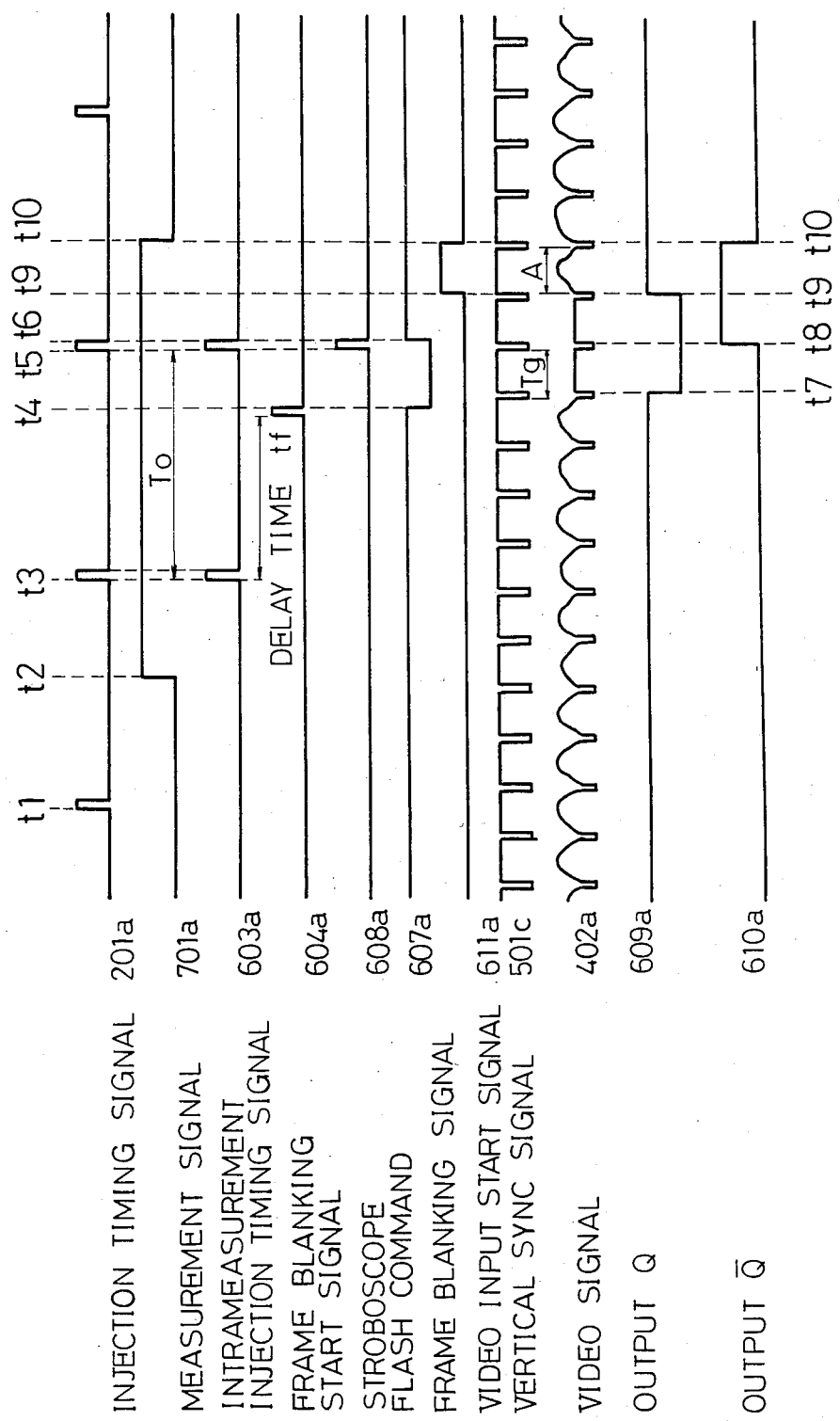
FIG. 7 is a timing chart for explaining the operation performed in the exemplary apparatus of FIG. 6.

FIG. 7 shows a timing chart relative to the operation performed in the apparatus of this invention. When the motor 108 is driven, the pump 103 is rotated via the pulley to inject a fuel from the nozzle 101, thereby forming an atomized fuel mist 105. The disk 202 is rotated synchronously with rotation of the injection pump 103, so that the light received through the slit 202a activates the injection timing sensor 201 to produce an injection timing signal 201a. Then the microcomputer 7 produces a measurement start signal 701a. The latch circuit 602 is set synchronously with rise of the injection timing signal 201a, and the AND gate 603 produces an intrameasurement injection timing signal 603a at time t3. Subsequently the delay circuit 604 functions to delay the signal 603a for a predetermined period of time tf, thereby outputting a frame blanking start signal 604a. The fall detector circuit 605 detects fall of the signal 604a and places the set-reset circuit 607 in its set state at time t4. As a result, a frame blanking signal 607a is produced at the Q terminal of the set-reset circuit 607. And the controller 402 of the television camera 4 halts its scanning in response to this blanking signal 607a synchronously with a vertical synchronizing signal.

In this manner, preparation is executed for inputting the image of an atomized fuel mist 105. To determine time t4 for generation of a frame blanking signal, a delay time tf is so selected as to satisfy the condition Tg<-To—tf<2×Tg where To is an injection period, and Tg is a vertical synchronizing signal period. When an atomized fuel mist 105 is formed by the nozzle 101, a next injection timing signal 201a is produced at time t5 simultaneously therewith. Then the AND gate 603 provides an intrameasurement injection timing signal 603a, and the AND gate 608 receiving both this timing signal 603a and a frame blanking signal 607a provides a stroboscope flash command 608a at time t5, so that the stroboscope driving circuit 302 activates the stroboscope 301 to irradiate the atomized fuel mist 105. The intrameasurement injection timing signal 603a falls in accordance with fall of the injection timing signal 201a at time t6, and similarly the stroboscope flash command 608a falls. The detector circuit 606 functions to detect fall of the flash command 608a and thereby resets the set-reset circuit 607. As a result, the frame blanking signal 607a rises at time t6 to terminate the frame blanking period. Subsequently, the controller 402 of the television camera 4 starts scanning the image pickup tube 401 in the camera at time t9 synchronously with the vertical synchronizing signal. The video signal 402a is synchronized with rise of the vertical synchronizing signal at time t9 and is outputted as a signal for a succeeding frame, as represented by a portion A in FIG. 7. The portion A corresponds to one picture of the television camera and includes 256 horizontal synchronizing signals. For digitizing the picture in the portion A of video signal 402a and storing the same as luminance data, a video input start signal 611a is produced in the following manner to determine the time of one frame. The D type FF circuit 609 latches a frame blanking signal 607a synchronously with a vertical synchronizing signal 501c, so that its output 609a obtained at the Q terminal has a waveform falling at time t7 and rising at time t9. Since another D type FF circuit 610 latches such Q-terminal output 609a synchronously with the vertical synchronizing signal, its output 610a obtained at the Q terminal has a waveform rising at time t8 and falling at time t10. Consequently, posterior to termination of the frame blanking period, the AND gate 611 provides a video input start signal 611a which rises at time synchronously with the next vertical synchronizing signal and falls at time t10 synchronously with the next vertical synchronizing signal. With the exception of the frame blanking period, the video A-D converter 501 digitizes the video signal 402a by using vertical and horizontal synchronizing signal and sampling the one-frame video signal while dividing the horizontal synchronizing period into 256 segments. That is, the converter 501 produces an address signal 501a which represent the sampling timing and a luminance data signal 501b which corresponds to the plane coordinates of each picture element. Accordingly, when the video input start signal 611a is inputted to the AND gates 502 and 503, the picture memory 504 receives both the address signal 501a and the luminance data signal 501b, so that the luminance data is stored at the address which is decided by the address signal. The microcomputer 7 detects fall of the video input start signal 611a at time t10 and changes the measurement start signal 701a to a low level at the same time, whereby inputting the picture data is completed.

Thus, in the video input memory 5 is stored the plane luminance distribution function F(X,Y) obtained by sampling the optical image of the injected fuel in conformity with the plane coordinates of individual picture elements divided in the form of a matrix. The luminance data is stored after the luminance level of the video signal is converted into digital values ranging from 0 to 15.

Figure 8:
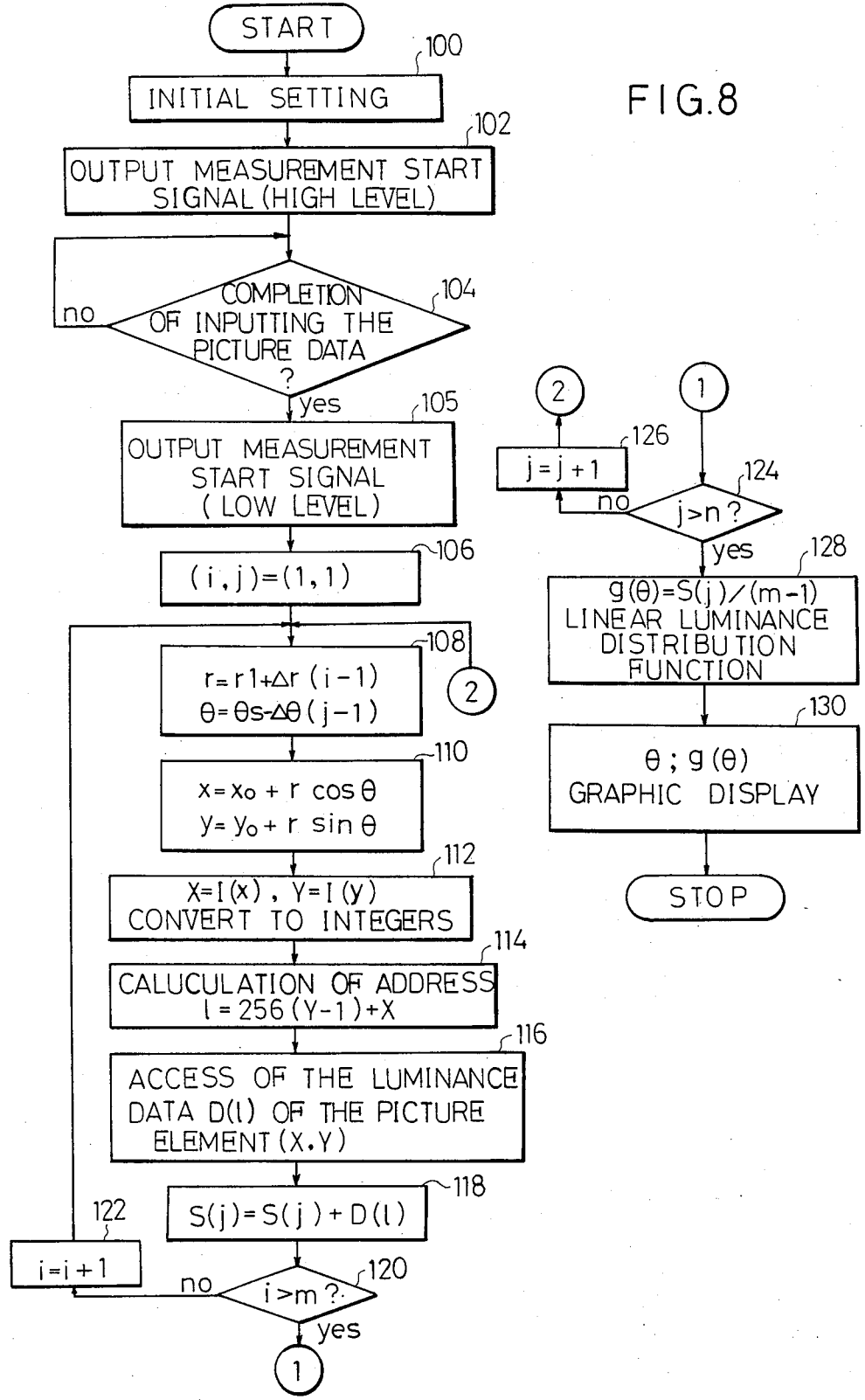
FIG. 8 is a flowchart showing sequential processing steps executed by a computer employed in the apparatus of FIG. 6.

The control operation of the microcomputer will be described below with reference to the flowchart of FIG. 8. The computer starts execution of the program from step 100, where initial setting of parameters is carried out. Then a measurement start signal 701a is produced in step 102, and input of picture data is judged to be completed or not in step 104. Completion of such input can be ascertained by inputting a video input start signal 611a and detecting its fall.

Upon completion of inputting the picture data, the process advances to step 105 where the measurement start signal 701a is turned to a low level, thereby terminating the measurement. In step 106, each of integral variables I and J is established to be 1. And in step 108, sampling polar coordinates (r, θ) are determined as follows for measuring the shape of injection in conformity with the polar coordinates as graphically shown in FIG. 2.

$$r = rl + \Delta r(i-1) \qquad (4)$$

$$\theta = \theta s - \Delta\theta(j-1) \qquad (5)$$

where rl is an initial position to determine an average interval; Δr is a small increase in the direction of a radius vector; Δs is an upper limit of the azimuthal angle; and Δθ is a small variation in the direction θ.

In this manner, (r, θ) are defined as discrete values with the integral variables (i, j) used as parameters.

Subsequently, the process advances to step 110, in which the polar coordinates (r, θ) are converted to corresponding orthogonal coordinates (x, y).

$$x = xo + r \cos\theta \qquad (6)$$

$$y = yo + r \sin\theta \qquad (7)$$

where $(x_0, y_0)$ denote the coordinates of an origin of injection.

In step 112, the orthogonal coordinates thus obtained are converted to integers (X, Y), which therefore denote the coordinates of a picture element corresponding to the aforesaid coordinates (x, y) and relate to the address of that picture element.

Next in step 114, the following equation is calculated to find the address 1 where the luminance data of the picture element specified by the integral orthogonal coordinates is stored.

$$1 = 256(Y-1) + X \tag{8}$$

Then the process advances to step 116, where the data is read out from the picture memory 504 so that the luminance data D (1) of the picture element (X, Y) is obtained.

In step 118, the luminance data D (1) is added until the parameter i reaches a predetermined value m. The upper limit m is judged in step 120 (where m denotes the number of sampling points in the direction of a radius vector), and the value i is renewed in step 122. It follows, therefore, that the sum of the luminances at sampled points along a line from Q1 to Q2 in FIG. 2 is calculated as S (j).

Subsequently the process advances to step 124 to ascertain whether j is greater than a predetermined value n. And in case the former is smaller, the value j is increased gradually by addition of 1 at a time in step 126, and the process returns to step 108 to calculate the sum of the luminance data obtained by radial sampling in the next aximuthal angle shifted by an angle $\Delta\theta$.

Consequently, in step 128, the value S (j) denotes the total luminance summed up along a fixed line element w per discrete angle $\theta$. Therefore, the linear luminance distribution function $g(\theta)$ along the cut line t can be obtained from S (j) by the following equation.

$$g(\theta) = S\,(j)/(m-1) \tag{9}$$

where $(m-1)$ is a factor for averaging the luminance.

Next in step 130, the linear luminance distribution function $g(\theta)$ relative to the azimuthal angle is gradually plotted by the output unit 13. Its waveform becomes such as shown in FIG. 3.

The linear luminance distribution function $g(\theta)$ thus obtained denotes the average luminance in one segment taken in the direction of a radius vector with respect to each angle $\theta$, representing the average luminance distribution characteristic in the azimuthal direction. The luminance represents the quantity of the atomized fuel mist or the presence or absence thereof, and the value of $g(\theta)$ corresponds to the concentration of such atomized fuel mist. Accordingly, the atomized-fuel distribution characteristic is represented by the linear luminance distribution function $g(\theta)$, so that the atomized-fuel concentration distribution can be evaluated by extracting the feature quantity of $g(\theta)$. Furthermore, by normalizing the entirety of $g(\theta)$ as 1, it becomes possible to directly known the rate of presence of the atomized fuel mist at any specified injection angle against the entire angle. Due to such normalization, harmful influence can be eliminated despite any variation induced in the luminance of the atomized fuel mist or the sensitivity of the television camera by a change caused in the flash intensity of the stroboscope. Besides the above, it is further possible to selectively determine a fixed threshold value and to normalize any luminance distribution function greater than such threshold value. Hereinafter an explanation will be given with regard to a program prepared for extracting various shape factors from the linear luminance distribution function $g(\theta)$.

Figure 9:
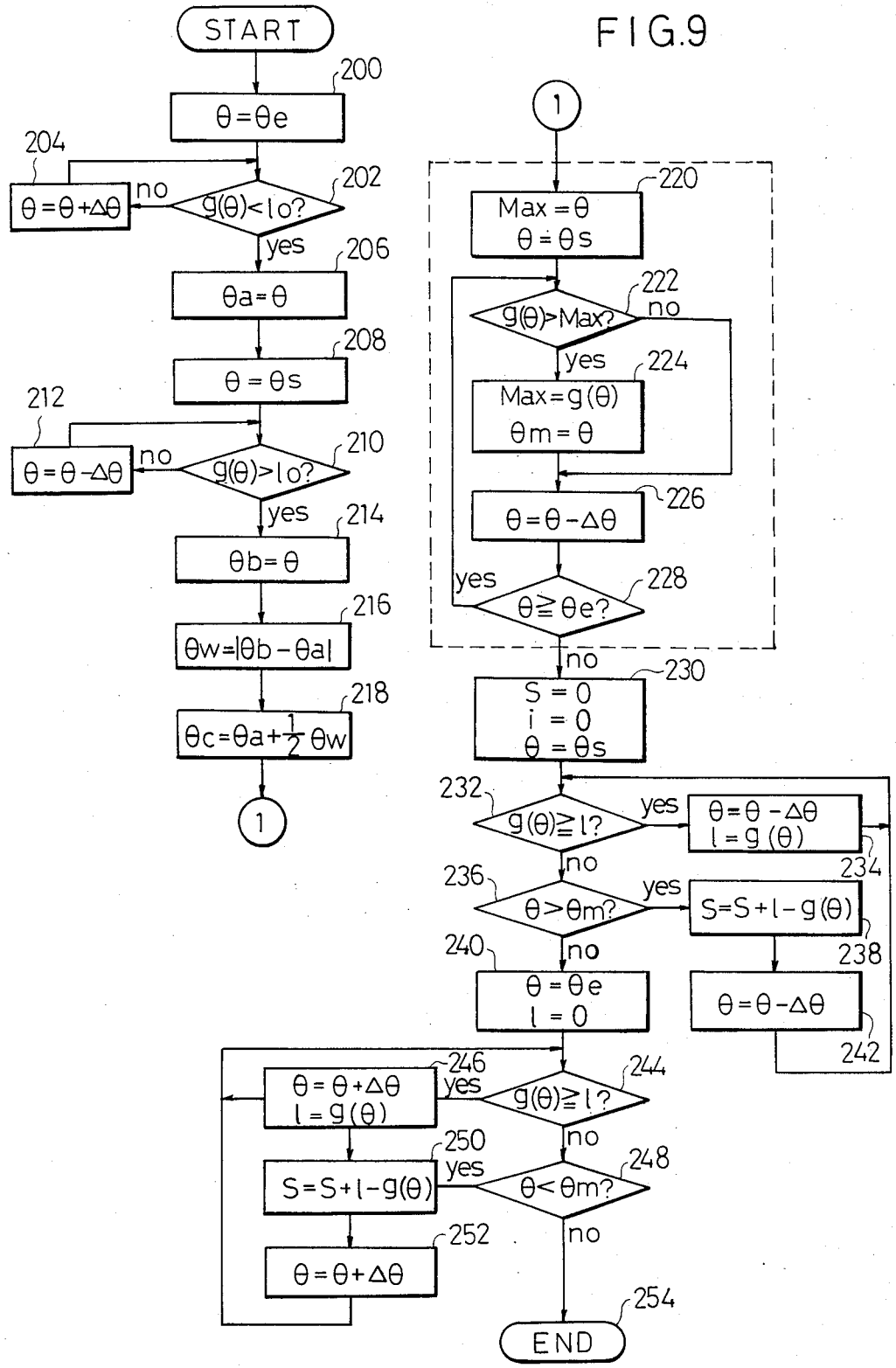
FIG. 9 is a flowchart showing sequential steps of extracting various shape factors from a linear luminance distribution function.

FIG. 9 is a flowchart showing sequential steps for execution of such program, where an azimuthal angle $\theta$ is set at a minimum value $\theta e$ in step 200. The luminance $g(\theta)$ thereat is compared with a predetermined threshold luminance lo in step 202 and, in case the former is smaller, the value $\theta$ is incrementally renewed by $\Delta\theta$ in step 204. When the former exceeds the predetermined threshold value lo, the process advances to step 206 to record the value $\theta$ at the moment as $\theta a$. In this manner, the azimuthal angle $\theta$ at the moment to cross the predetermined threshold value is obtained. Similarly, after setting the angle $\theta$ at a maximum value $\theta s$, the same procedure as the foregoing is executed up to step 214, whereby the azimuthal angle b at which $g(\theta)$ crosses the threshold value lo is obtained.

Subsequently in step 216, the waveform width $\theta w$ can be computed as an absolute value $|\theta b - \theta a|$. And also the waveform center $\theta c$ can be computed as $\theta a + \frac{1}{2} \cdot \theta w$ in step 218.

The procedure for obtaining a maximum value in the waveform, an angle $\theta$ thereat and a recess area is executed in step 220 and downward. First in steps 220 through 228, the maximum value in the waveform is computed by setting Max at an initial value 0, then searching $g(\theta)$ while sequentially changing from $\theta s$ by $\Delta\theta$ at a time to compare each value $g(\theta)$ with Max, and storing the greater one for renewal of Max. The value $\theta$ is compared with the lower limit $\theta e$ in step 228 and, when the former becomes smaller than the latter, the process advances to step 230. It follows that in this stage a maximum luminance is stored as Max, and an azimuthal angle providing such maximum luminance is stored as $\theta m$, respectively.

Subsequently the recess area S is computed in step 230 by first setting the area S at 0 and the maximum luminance 1 also at 0, then changing $\theta$ sequentially from $\theta s$ and carrying out the foregoing procedure to obtain the maximum value. With execution of steps 232 and 234 in sequence, the maximum value is stored as 1. Upon finding the maximum value, the process advances to step 236 where the azimuthal angle $\theta$ thereat is compared with the angle $\theta m$ which provides the maximum luminance. And in case the former is greater, the process advances to step 238 to increase the area S by $1 - g(\theta)$. That is, execution of the loop of steps 232-236-238-242-232 enables addition of the recess area which is a region smaller than the maximum value 1. When the luminance $g(\theta)$ searched in step 232 exceed the first maximum value, a next maximum value is computed through step 234, and similarly the area of a next recess is added in steps 236, 238 and 242. When the angle $\theta$ is smaller than $\theta m$ providing the maximum value in step 236, the process advances to step 240 where the angle $\theta$ is set at its lower limit $\theta e$ and the foregoing procedure is executed with the incremental direction of the angle $\theta$ being inverted, thereby computing the recess area not shown in the left half of FIG. 3. The value S in step 254 represents the sum of the recesses areas. Thus the total areas of the recesses in the waveform is obtainable as mentioned above.

The recess area computed in this manner corresponds to the area of the split V in the injected substance shown in FIG. 1, and it is utilizable to inspect the shape of the injected substance as well as to ascertain whether the nozzle is proper or not.

Another shape factor may be extracted through addition of a fuel luminance in the prohibited region where the presence of any atomized fuel mist is not permitted, and the nozzle may be appraised in accordance with the extracted value.

Hereinafter an explanation will be given on a second exemplary apparatus embodying the invention.

Figure 10:
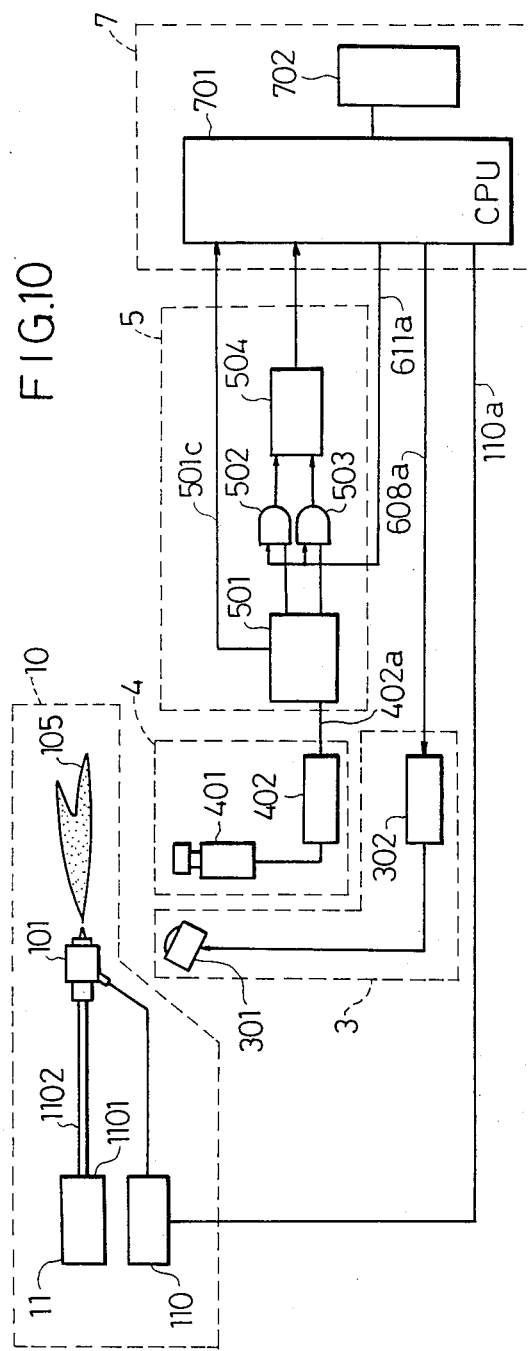
FIG. 10 is a block diagram showing the constitution of a second exemplary apparatus embodying the invention.

FIG. 10 is a block diagram showing the constitution of the apparatus which employs a solenoid injection valve. An injector 10 having a structure of solenoid injection valve receives an injection driving signal 110a from a microcomputer 701 and controls injection of a solenoid valve 101. A television camera 4 and a video input memory 5 are structurally the same as those employed in the aforementioned first embodiment. Since the injector 10 in the second embodiment is capable of controlling the injection timing by injection driving signal 110a which is in the form of an electric signal, no frame blanking signal is required. Furthermore, an injection timing detector and a control signal generator are not necessary as both a stroboscope flash signal 608a and a video input start signal 611a can be produced with proper timing taken by the microcomputer 7.

Figure 11:
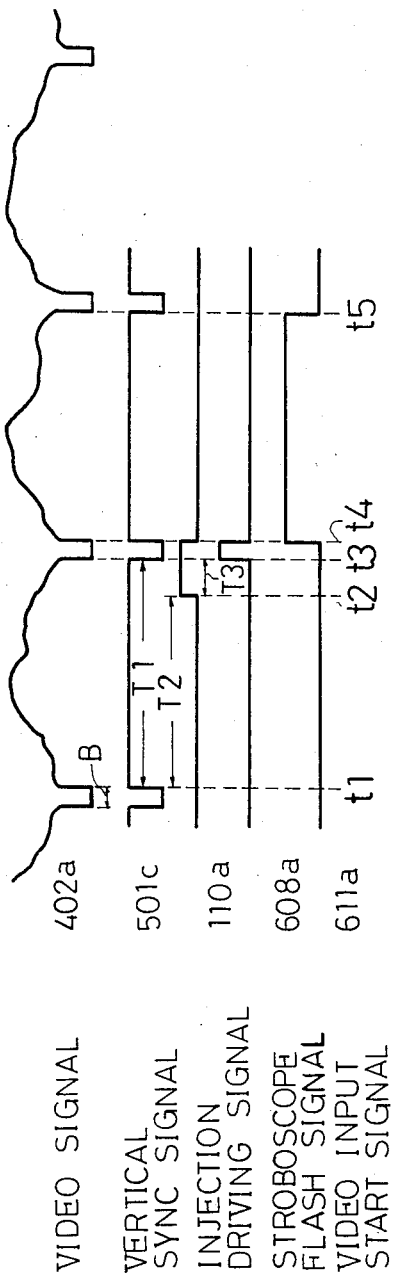
FIG. 11 is a timing chart for explaining the operation performed in the apparatus of FIG. 10.
Figure 12:
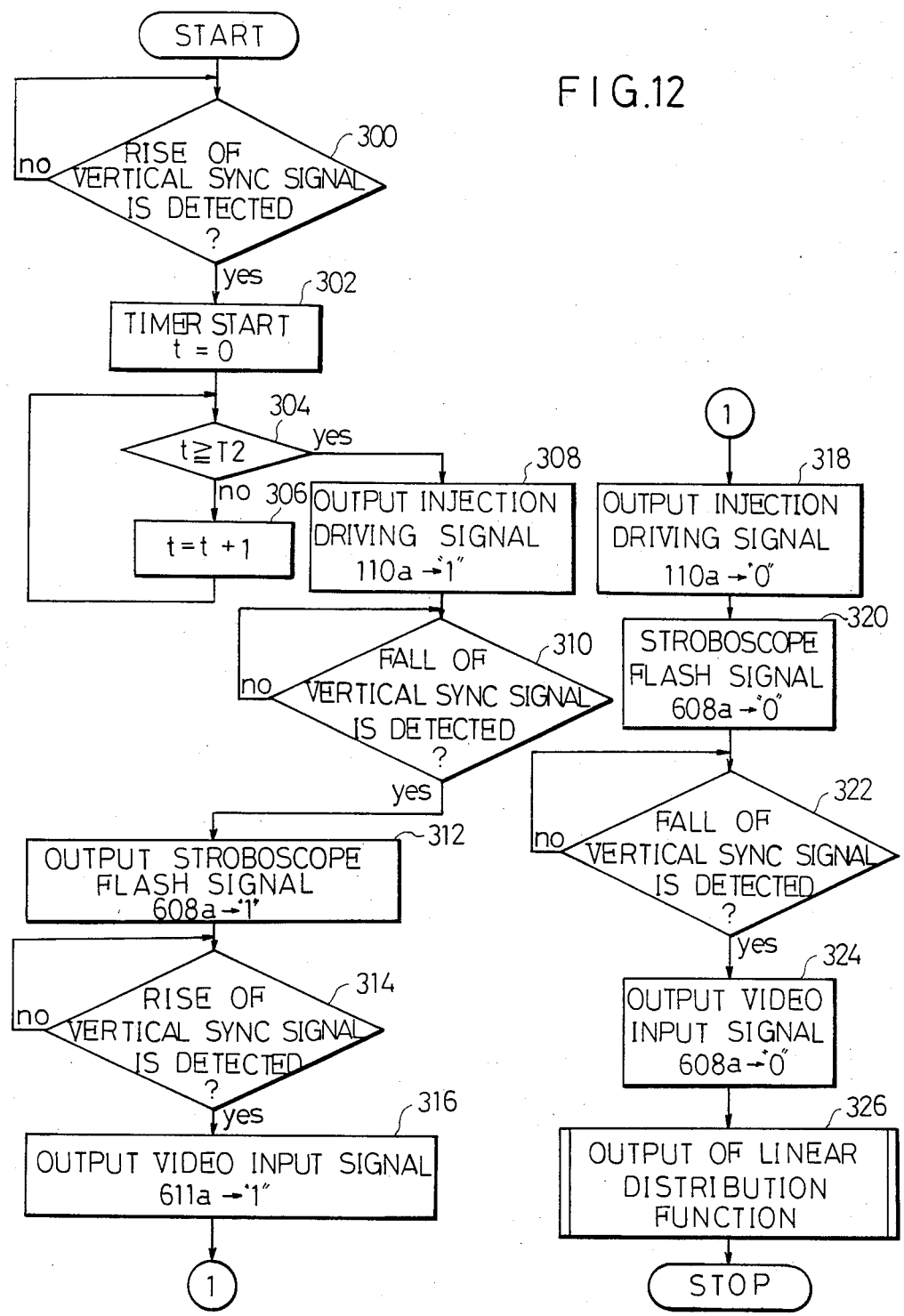
FIG. 12 is a flowchart showing sequential processing steps executed by a computer employed in the apparatus of FIG. 10.

The operation performed in the above apparatus will now be described below with reference to the timing charter of FIG. 11 and the flowchart of FIG. 12. In step 300, the computer receives a vertical synchronizing signal 501c from the video A-D converter 501 and detects its rise. Upon detection of the rise at time t1, the process advances to step 302 for starting the timer. And when the output of the counter exceeds a predetermined value T2 at time t2, an injection driving signal 110a is turned to a high level in step 308. As a result, fuel is injected from the nozzle to from an injected fuel mist 105. Subsequently, when fall of the vertical synchronizing signal is detected at time t3 in step 310, the process advances to step 312 for turning a stroboscope flash signal 608a to a high level and feeding the same to the stroboscope driving circuit 302. Consequently the stroboscope emits light to project an optical image onto the image pickup tube 401. Rise of the vertical synchronizing signal 501c is detected in step 314, and the video input start signal 611a is turned to high level at time t4 in step 316. Since the video input start signal is fed to both the AND gates 502 and 503, the luminance data sampled in conformity with individual coordinates is stored in the picture memory 504 as in the foregoing first embodiment. Next, the injection driving signal 110a is turned to a low level at time t4 in step 318, and the stroboscope flash signal 608a is turned to a low level in step 320. Then the process advances to step 322 where the video input start signal is turned to a low level when fall of the next vertical synchronizing signal is detected at time t5.

Inputting a series of such data is thus completed, an the computer executes an arithmetic routine 326 as in the foregoing first embodiment.

By properly controlling the delay time T2 to determine the rise of the injection driving signal 110a, it is rendered possible to control the relative shape measurement timing with respect to the injection start timing.

As described hereinabove, the second exemplary embodiment is so designed as to control the injection timing in accordance with the control signal from the microcomputer and to control the stroboscope flash timing while inputting the data.

In the first and second embodiments mentioned above, an atomized fuel mist is irradiated by a stroboscope and, after the lapse of a fixed period of time from the injection, the shape of the atomized fuel mist is picked up in the form of video signal, which is then inputted as luminance data. However, the arrangement may be so modified as to perform the operation by opening the solenoid valve 101 to effect continuous fuel injection, subsequently irradiating light in succession and inputting the picture data of such continuous atomized fuel mist. Since the particles of the atomized fuel are moved in the direction of injection, the picture derived from the video signal has long particle shadows extending in the direction of injection. However, according to the present invention where a linear luminance distribution function along the cut line is computed by integrating and averaging the luminance in the direction of injection, any harmful influence resulting from such particle movement can be eliminated.

Although the aforesaid examples have been described with regard to a nozzle injector and a carburetor in an internal combustion engine, it is to be understood that the present invention is applicable also to measuring the shape of an atomized liquid or solid in a sprinkler, aerosol sprayer or similar device, and further to measuring distribution of an injected power as well as to flame distribution in a flame thrower.

What is claimed is:

1. A method of measuring the shape of an injected substance, comprising the steps of; forming, on a photoelectric converter, an optical image of the substance injected from an opening; scanning the optical image on said photoelectric converter and thereby producing a video signal corresponding to the luminance of said optical image; sampling said video signal in conformity wih plane coordinates on said photoelectric converter and computing a plane luminance distribution function of said optical image; determining a line to cut said optical image, then selecting line elements of a fixed length perpendicular to said line, and computing an average luminance at the individual line elements on the basis of said plane luminance distribution function, thereby obtaining a linear luminance distribution function of said optical image along said cut line; and specifying the shape of said injected substance according to said linear luminance distribution function.

2. A method according to claim 1, wherein said cut line is taken along an azimuthal direction in the polar coordinates whose origin is at the center of injection of said optical image.

3. A method according to claim 1, wherein said cut line is taken perpendicularly to the center axis of injection of said optical image.

4. A method according to claim 1, wherein specifying the shape of said injected substance according to said linear luminance distribution function is executed on the basis of at least one shape factor extracted out of the width of the waveform of said function, the portion of the center line of said waveform, the center of gravity of said waveform, the total area of said waveform, the area of a racess in said waveform, and the ratio of the waveform area in a predetermined region to the total waveform area.

5. A method according to claim 1, wherein said linear luminance distribution function is normalized.

6. An apparatus for measuring the shape of an injected substance, comprising: a photoelectric converter on which an optical image of the substance injected from an opening is projected; a video signal output unit for scanning the optical image on said photoelectric converter and thereby producing a video signal corresponding to the luminance of said optical image; a sampling unit for sampling said video signal in conformity with plane coordinates on said photoelectric converter and outputting a digital signal; a data memory unit for storing therein the luminance data, which is in the form of a digital signal outputted from said sampling unit, in conformity with the sampled plane coordinates; an arithmetic unit for computing, from said luminance data, an average luminance at individual line elements of a fixed length perpendicular to a cut line taken on said optical image, thereby obtaining a linear luminance distribution function of said optical image along said cut line; and an output unit for providing said linear luminance distribution function.

7. An apparatus for measuring the shape of an injected substance according to claim 6, further complising a caluculating unit for specifying the shape of said injected substance according to said linear luminance distribution function, which executes on the basis of at least one shape factor extracted out of the width of the waveform of said function, the portion of the center line of said waveform, the center of gravity of said waveform, the total area of said waveform, the area of recess in said waveform, and the ratio of the waveform area in a predetermined region to the total waveform area.

* * * * *